(12) United States Patent
Sanacore

(10) Patent No.: US 10,411,462 B2
(45) Date of Patent: Sep. 10, 2019

(54) MEDIUM VOLTAGE POWER SUPPLY

(71) Applicant: ANSALDO ENERGIA S.p.A., Genoa (IT)

(72) Inventor: Gaetano Sanacore, Calatafimi-Segesta (IT)

(73) Assignee: ANSALDO ENERGIA S.P.A., Genoa (IT)

( * ) Notice: Subject to any disclaimer, the term of this patent is extended or adjusted under 35 U.S.C. 154(b) by 0 days.

(21) Appl. No.: 15/762,746

(22) PCT Filed: Sep. 23, 2016

(86) PCT No.: PCT/IB2016/055705
§ 371 (c)(1),
(2) Date: Mar. 23, 2018

(87) PCT Pub. No.: WO2017/051372
PCT Pub. Date: Mar. 30, 2017

(65) Prior Publication Data
US 2018/0219371 A1 Aug. 2, 2018

(30) Foreign Application Priority Data
Sep. 23, 2015 (IT) .................... 102015000054571

(51) Int. Cl.
*H02H 7/26* (2006.01)
*H02H 1/00* (2006.01)
*G05B 19/048* (2006.01)

(52) U.S. Cl.
CPC .......... *H02H 7/261* (2013.01); *G05B 19/048* (2013.01); *H02H 1/0061* (2013.01); *H02H 1/0076* (2013.01); *G05B 2219/21155* (2013.01)

(58) Field of Classification Search
CPC .... H02H 7/261; H02H 1/0061; H02H 1/0076; G05B 19/048; G05B 2219/21155
See application file for complete search history.

(56) References Cited

U.S. PATENT DOCUMENTS 9,048,697 B2 6/2015 Wang et al.
9,279,846 B2 3/2016 Schuster et al.
(Continued)

FOREIGN PATENT DOCUMENTS

CN 102484394 A 5/2012
CN 103688434 A 3/2014

OTHER PUBLICATIONS

Wikipedia contributors. (Dec. 30, 2018). Electric switchboard. In Wikipedia, The Free Encyclopedia. Retrieved 23:42, May 3, 2019, from https://en.wikipedia.org/w/index.php?title=Electric_switchboard&oldid=875988588 (Year: 2019).*
(Continued)

*Primary Examiner* — Daniel J Cavallari
(74) *Attorney, Agent, or Firm* — Buchanan Ingersoll & Rooney PC

(57) ABSTRACT

A medium voltage power supply is disclosed as including plural medium voltage power lines and plural medium voltage switchboards, connected by respective medium voltage power lines. The medium voltage switchboards are each provided with a respective electrical protection equipment under the IEC 61850 standard and with respective medium voltage signal couplers driven by the electrical protection equipment to transmit and receive Generic Object Oriented Substation Event messages through the medium voltage power lines.

10 Claims, 2 Drawing Sheets

(56) References Cited

U.S. PATENT DOCUMENTS

2011/0282507 A1* 11/2011 Oudalov .................. H04B 3/54
700/292
2012/0089262 A1 4/2012 Wang et al.
2013/0257560 A1 10/2013 Fiorelli et al.
2014/0159740 A1 6/2014 Schuster et al.

OTHER PUBLICATIONS

Wikipedia contributors. (Apr. 12, 2019). IEC 61850. In Wikipedia, The Free Encyclopedia. Retrieved 23:45, May 3, 2019, from https://en.wikipedia.org/w/index.php?title=IEC_61850&oldid=892131741 (Year: 2019).*

Notification of the First Office Action dated Dec. 5, 2018, by the Chinese Patent Office in corresponding Chinese Patent Application No. 201680055697.X, and an English Translation of the Office Action. (15 pages).

International Search Report (PCT/ISA/210) dated Feb. 10, 2017, by the European Patent Office as the International Searching Authority for International Application No. PCT/162016/055705.

Written Opinion (PCT/ISA/237) dated Feb. 10, 2017, by the European Patent Office as the International Searching Authority for International Application No. PCT/IB2016/055705.

Cataliotti et al., Characterization of Medium Voltage Cables for Power Lines Communication, *15th IMEKO TC4 International Symposium on Advanced of Measurement Science*, Sep. 19-21, 2007, pp. 1-6, laşi, Romania.

Mulroy et al., Comparison of Coupling Methods in MV Equipment for Powerline Communications, *21st International Conference on Electricity Distribution*, Jun. 6-9, 2011, pp. 1-4, Paper 0870, Frankfurt, Germany.

Hou et al., IEC 61850—What It Can and Cannot Offer to Traditional Protection Schemes, SEL Journal of Reliable Power, Oct. 1, 2010, pp. 1-12, vol. 1, No. 2, Schweitzer Engineering Laboratories, Inc.

* cited by examiner

MEDIUM VOLTAGE POWER SUPPLY

TECHNICAL FIELD

The present invention relates to a medium voltage power supply.

BACKGROUND ART

As is known, power distribution networks are used for delivery to end users of electricity produced at power stations and made available through high-voltage transmission networks. Distribution networks, generally operating in the medium voltage range (between 1 kV and 30-75 kV for alternating current and between 1.5 kV and 30-75 kV for direct current, according to the definitions given in a number of national standards), comprise, besides, of course, the medium voltage lines, primary substations, secondary substations, and one or more supervision and control apparatuses. The primary substations convert the voltage from high to medium and supply power to the secondary substations, which convert the voltage from medium to low and deliver it to the end users.

An ineliminable function to be implemented by respective switchboards from both primary and secondary substations concerns the protection of the network, i.e. the detection and signalling of faults (overloads, short circuits, electric arcs between phases, interruptions, and so forth) and the ability to implement emergency manoeuvres such as opening the switches and insulating network sections in which the faults detected are located. The signalling of faults, obviously, cannot leave aside communication to surrounding switchboards and to the supervision and control apparatus. For this purpose, Ethernet line and fibre-optic connections, or wireless connections, are used. In addition, communications can be based on specific protocols.

Given the critical nature of the protective functions, the connections are usually redundant. Nevertheless, accidents may occur which make the connections simultaneously unserviceable for more or less extended periods of time. In some cases, the connection malfunctions can be resolved quickly through actions requested by self-diagnosis or remote functions, such as restore operations (reset) of the equipment concerned. Other times, the damage may be more severe with longer downtime. For example, some of the equipment may fail or the lines can may severed during the execution of works, thus requiring replacement. In all such cases, however, the protective functions of a part of the medium-voltage network are impaired for a period of time.

Therefore, there is a need to strengthen the communication of the primary and secondary substation switchboards of the medium-voltage networks with each other and with the supervision and control apparatus, reducing the risk of disruption of the protective functions. At the same time, it should be borne in mind that it is appropriate not to weigh too heavily on the costs of construction, management and maintenance of the networks.

DISCLOSURE OF INVENTION

Therefore, the object of the present invention is to provide a medium voltage power supply which allows for the overcoming of the limitations described above.

According to the present invention, a medium voltage power supply is provided as defined in claim 1.

BRIEF DESCRIPTION OF THE DRAWINGS

The present invention will now be described with reference to the accompanying drawings, which illustrate a non-limiting embodiment thereof, in which.

BEST MODE FOR CARRYING OUT THE INVENTION

Figure 1:
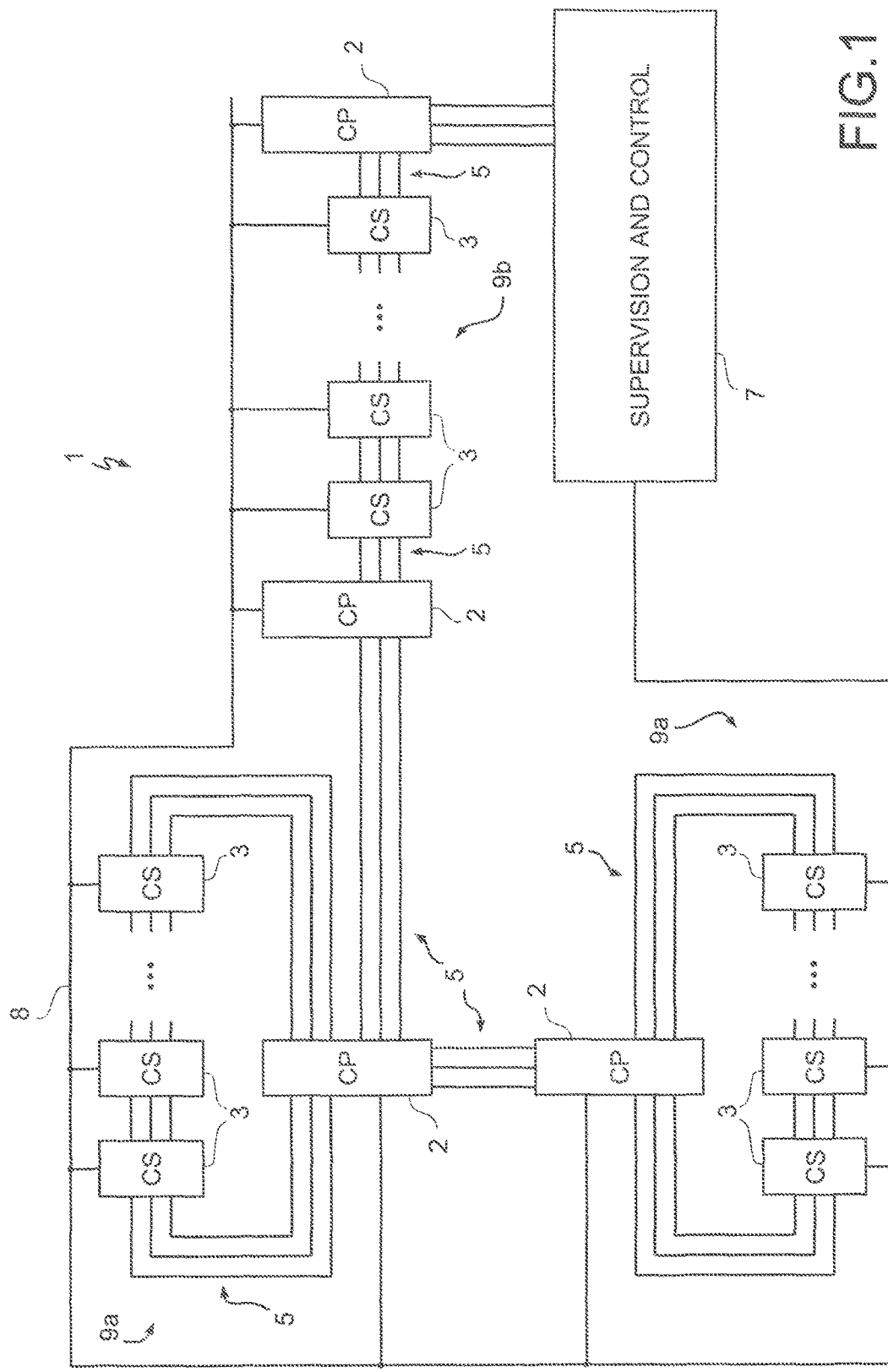
FIG. 1 is a simplified block diagram of a medium voltage power supply according to one embodiment of the present invention.

FIG. 1 schematically illustrates a portion of a medium voltage power supply 1 that comprises primary substations 2, secondary substations 3, medium voltage power lines 5 between respective primary substations 2 and secondary substations 3, a supervision and control apparatus 7 and a data network 8.

The primary substations 2 are coupled to a high voltage power supply (not shown) and convert the input power from high voltage to medium voltage power. Instead, the secondary substations 3 convert the medium voltage power into low voltage power for distribution to the end users.

Several secondary substations 3 may be connected with a single primary substation 2, forming mesh subnets 9a. Alternatively, secondary substations 3 may form backbone subnets 9b between respective pairs of primary substations 2.

Figure 2:
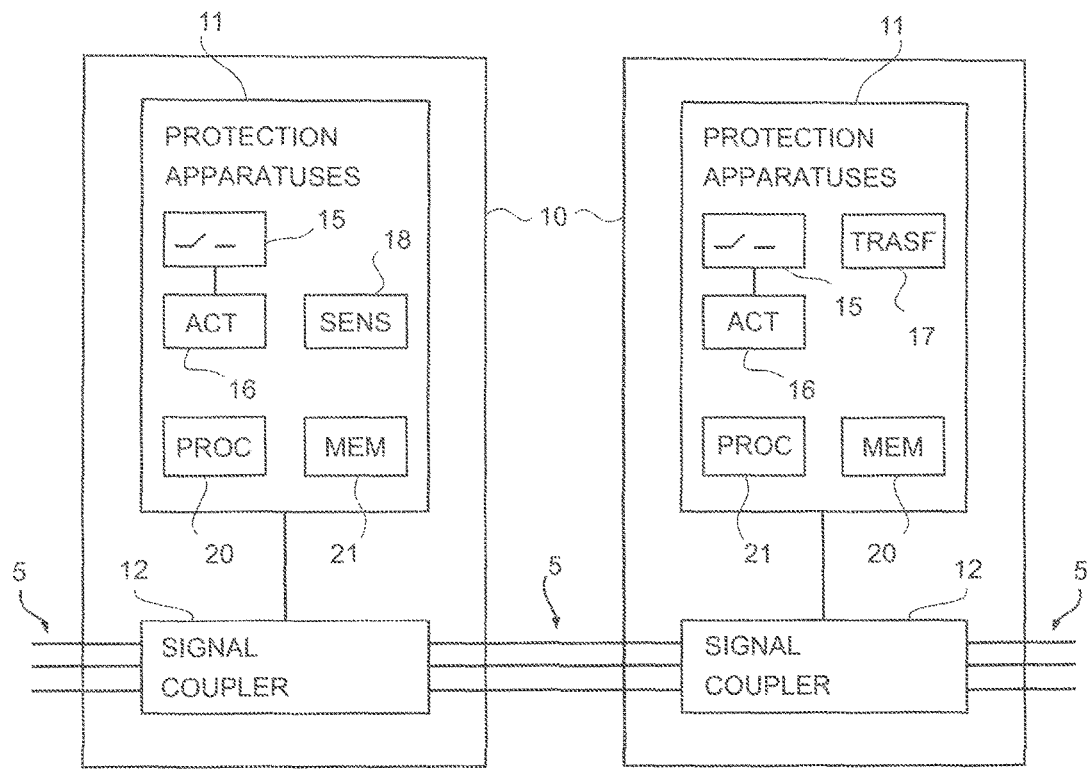
FIG. 2 is a more detailed block diagram of the medium voltage power supply of FIG. 1.

The primary substations 2 and the secondary substations 3 comprise respective medium voltage switchboards 10, some of which are shown by way of example in FIG. 2 (which shows, in particular, a primary substation). The switchboards 10 are provided with medium voltage electrical protection equipment 11 and with respective medium voltage signal couplers 12 and are mutually connected by respective medium voltage power lines 5.

The medium voltage signal couplers 12 allow signals to be transmitted and received through the medium voltage power lines 5 and for this purpose are driven by the respective electrical protection equipment 11. The signals may include data strings organised into packages containing information about, for example, measures, the status of the switches, controls and warning messages. Therefore, the electrical protection equipment 11 may use the medium voltage power lines 5 for communication between the switchboards 10 of a single substation or of different substations and for communication between each switchboard and the supervision and control apparatus 5. In one embodiment, the medium voltage signal couplers 12 may be of the inductive or capacitive type and may exploit points of coupling to the medium voltage power lines 5, which already exist. Examples of signal couplers that may be advantageously used for receiving and transmitting signals through medium voltage power lines (Power Line Communication, PLC) are described in:

US 2013/0257560 A1;

Cataliotti, Tiné, Sanacore, Daidone, "Characterization Of Medium Voltage Cables For Power Lines Communications", 15th IMEKO TC4 International Symposium on Advanced of Measurement Science, Iasi, Romania, Sep. 19-21, 2007;

Mulroy, Gilbert, "Comparison Of Coupling Methods In MV Equipment For Powerline Communications", 21st International Conference on Electricity Distribution, Frankfurt, 6-9 June 2011, paper 0870.

In the switchboards 10 of both the primary 2 and secondary 3 substations, the electrical protection equipment 11 is made according to the IEC 61850 standard and is configured to transmit and receive Generic Object Oriented Substation Event (GOOSE)-type messages. The GOOSE message service is defined within the IEC 61850 standard and allows any data format encapsulated in a data structure to be sent in less than a threshold time period, ensuring the speed and reliability requirements of the communication also for the medium voltage network. In particular, the GOOSE message service allows warning messages and controls to be sent and received. In one embodiment, the medium voltage signal couplers 12 are configured to encrypt GOOSE messages. Encrypting GOOSE messages exchanged through the medium voltage power lines 5 advantageously allows for enhancing the security and confidentiality of communications, without affecting the overall costs of design, installation, management and maintenance of the distribution network 1.

The electrical protection equipment 11 may be different from a switchboard 10 to another in the medium voltage power supply 1. Generally, the electrical protection equipment 11 may comprise, for example, and not exclusively, one or more of the following devices: line interruption members 15, including switches and disconnectors; actuator mechanisms 16 for operating the line interruption members 15; (current and/or voltage) transformers 17, detection devices 18 (including current and/or voltage detectors, interphase short circuit detectors, earth fault detectors). Furthermore, the electrical protection equipment 11 may comprise a processing unit 20 and a memory module 21.

The processing units 20 are controlled by the supervision and control apparatus 7 and may be configured, for example, but not exclusively, to:
 transmit stand-by messages;
 receive and process status and/or error signals from devices incorporated in the respective electrical protection equipment 11;
 determine malfunctions of the respective medium voltage power lines 5 from the status and/or error signals received from the devices incorporated in the respective electrical protection equipment 11;
 determine protective actions from the status and/or error signals received (such as insulating a portion of the medium voltage power supply or creating alternative supply routes or counter-power supplies);
 generate commands in response to the status and/or error signals received;
 transmit to other switchboards 10 or to the supervision and control apparatus 7 status and/or error messages in response to the status and/or error signals received;
 transmit to other switchboards 10 command messages in response to the status and/or error signals received;
 receive and process status and/or error messages from other switchboards 10;
 receive commands from the supervision and control apparatus 7 or from other switchboards 10;
 execute commands corresponding to respective protective actions or in response to the reception of command messages (including manoeuvring the respective line interruption members 15 in response to the detection of a malfunction in the respective medium voltage power lines 5);
 store the messages received and transmitted in the respective memory module 21.

The sending and receiving of GOOSE messages by the electrical protection equipment 11 may occur either via the data network 8 (for example an Ethernet, fibre-optic or wireless network) or through the medium voltage signal couplers 12 and the medium voltage power lines 5, which define a redundant communication network compared to the data network 8. Thus, the processing units 20 are also configured to detect the status of the data network 8 and to switch over the communication to the medium voltage signal couplers 12 and the medium voltage power lines 5 in case of malfunction of the data network 8.

In particular, when the data network 8 is not available (such as due to malfunction or for cyber security reasons, for example, following the intervention of an algorithm to enforce security policies in accordance with the IEC 61850 and/or IEC 62351 standards for Ethernet or fibre-optic transmission channels), the electrical protection equipment 11 transmits and receives GOOSE messages through the respective medium voltage power lines by means of conveyed waves (Power-Line Communication, PLC).

The transmission and reception of GOOSE messages may occur in the publish/subscribe mode.

Going back to the functionality of the switchboards 10, the electrical protection equipment 11 allows at least for the detection of malfunctions in respective medium voltage power lines 5 and the transmission of respective GOOSE event messages in response to the detection of an event that affects the respective switchboard 10, in particular the detection of malfunctions in at least one of the medium voltage power lines 5. In the absence of malfunction or at the end of the transmission of GOOSE event messages, the electrical protection equipment 11 periodically transmits respective GOOSE stand-by messages. For instance, a new GOOSE stand-by message is transmitted after a T0 time interval (dependent on the transmission channel capacity) which may be comprised between 800 ms and 1,400 ms after the preceding GOOSE stand-by message.

Figure 3:
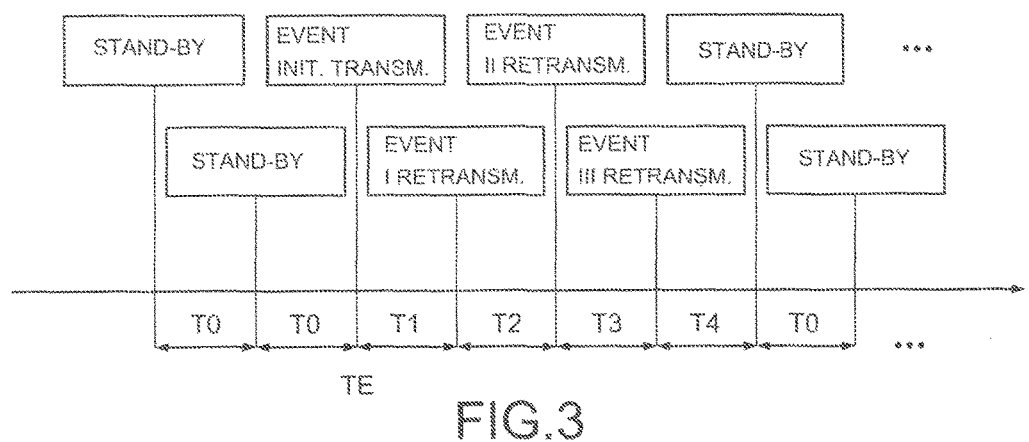
FIG. 3 is a diagram illustrating time quantities related to the present invention.

The electrical protection equipment 11 is configured to send a GOOSE event message through the medium voltage lines 5 by a procedure that provides for an initial transmission and for subsequent retransmissions by the electrical protection equipment 11. Also with reference to FIG. 3, GOOSE stand-by messages are transmitted periodically with a T0 stand-by interval from each other until a TE instant at which an event occurs, for instance a malfunction in a medium voltage power line 5. The initial transmission of the GOOSE event message is performed at the TE instant, immediately in response to the detection of the event (in fact with a negligible delay), without waiting for the end of the ongoing T0 stand-by interval. The electrical protection equipment 11 is configured to perform, for each GOOSE message transmitted (and different from the GOOSE stand-by messages), a first retransmission after a first retransmission interval T1 from the initial transmission, a second retransmission after a second retransmission interval T2 from the first retransmission, a third retransmission after a third retransmission interval T3 from the second retransmission, and a transmission of a stand-by message after a stand-by reset interval T4 from the third retransmission.

The retransmission time intervals T1-T3 and the stand-by reset interval T4 increase progressively (T1 to T4) and are specifically selected to allow for transmission under degraded communication conditions through the medium voltage power lines 5 (however, slower than the data network 8), so as to guarantee the reception times on a very noisy channel, such as the medium voltage power lines. In one embodiment, the first retransmission interval T1 is comprised between 4.5 ms and 6 ms (for example, 5 ms), the second retransmission interval T2 is comprised between 6.5 ms and 8 ms (for example, 7 ms), the third retransmission interval T3 is comprised between 8.5 ms and 10 ms (for example, 9 ms), and the stand-by reset interval T4 is comprised between 9.5 ms and 12 ms (for example, 11 ms) without receiving acknowledgement, thus in the broadcast mode.

Optionally, the processing units 20 of the electrical protection equipment 11 may be configured to send GOOSE acknowledgement messages in response to the receipt of GOOSE event messages, the receivers of which being the processing units 20 themselves. In this case, the processing units 20 that sent the original GOOSE event message immediately suspend the retransmissions in response to the GOOSE acknowledgement message, without waiting for the end of the sending procedure, and resume the periodic transmission of the respective GOOSE stand-by messages.

The use of the medium voltage power lines 5 in the Power Line mode for the transmission of GOOSE messages allows for the implementation of a redundant communication network, which becomes available in the event of a malfunction in the data network 8. The task of supporting communication between the components of the medium voltage power supply 1 (switchboards 10 and supervision and control apparatus 7) is usually entrusted to the data network 8, which, as all devices, is subject to faults and malfunction. The invention allows for the compensation for the temporary or permanent unavailability of the data network 8, avoiding the dangerous situation in which it is not possible to perform protective actions on the medium voltage power supply 1. Moreover, the invention essentially exploits the already existing structures of the medium voltage power supply 1 itself and thus affects the costs of construction, management and maintenance only to a limited extent.

Lastly, it is evident that the above-described medium voltage power supply can be subject to modifications and variations without departing from the scope of the present invention, as defined in the appended claims.

The invention claimed is:

1. A medium voltage power supply, comprising:
   a plurality of medium voltage power lines; and
   a plurality of medium voltage switchboards, connected by respective medium voltage power lines;
   wherein the medium voltage switchboards each include a respective IEC 61850 standard electrical protection equipment and respective medium voltage signal couplers driven by the electrical protection equipment to transmit and receive Generic Object Oriented Substation Event (GOOSE) messages through the medium voltage power lines.

2. The power supply according to claim 1, wherein the electrical protection equipment is configured to detect malfunctions in respective medium voltage power lines and to transmit respective GOOSE event messages in response to detection of malfunctions in at least one of the medium voltage power lines, and to transmit respective GOOSE stand-by messages when no GOOSE event messages are transmitted.

3. The power supply according to claim 2, wherein the electrical protection equipment is configured to perform, for each GOOSE event message transmitted, an initial transmission in response to detection of malfunctions in at least one of the medium voltage power lines, a first retransmission after a first retransmission time interval (T1) starting from the initial transmission, a second retransmission after a second retransmission time interval (T2) starting from the first retransmission, a third retransmission after a third retransmission time interval (T3) starting from the second retransmission, and a transmission of a stand-by message after a stand-by reset time interval (T4) starting from the third retransmission.

4. The power supply according to claim 3, wherein the first retransmission time interval (T1) is set to occur between 4.5 ms and 6 ms, the second retransmission time interval (T2) is set to occur between 6.5 ms and 8 ms, the third retransmission time interval (T3) is set to occur between 8.5 ms and 10 ms, and the stand-by reset time interval (T4) is set to occur between 9.5 ms and 12 ms.

5. The power supply according to claim 2, wherein the electrical protection equipment is configured to transmit the GOOSE stand-by messages periodically.

6. The power supply according to claim 5, wherein the electrical protection equipment is configured to transmit a new GOOSE stand-by message after a stand-by interval (T0) set to occur between 800 ms and 1,400 ms starting from a preceding GOOSE stand-by message.

7. The power supply according to claim 2, wherein the electrical protection equipment comprises:
   respective line interruption members and a respective processing unit, configured to actuate the respective line interruption members in response to detection of a malfunction in the respective medium voltage power lines.

8. The power supply according to claim 1, comprising:
   a data network connecting the medium voltage switchboards, the electrical protection equipment being configured to send GOOSE messages through the data network, to detect malfunctions in the data network, and to send GOOSE messages through the medium voltage power lines in response to the detection of malfunctions in the data network.

9. The power supply according to claim 8, comprising:
   a supervision and control apparatus for communicating with the medium voltage switchboards through the data network and configured to control the electrical protection equipment.

10. The power supply according to claim 1, wherein the medium voltage signal couplers are configured to encrypt GOOSE messages.

* * * * *